United States Patent
Jiang et al.

(10) Patent No.: US 11,659,501 B2
(45) Date of Patent: May 23, 2023

(54) METHOD AND DEVICE IN NODE FOR WIRELESS COMMUNICATION

(71) Applicants: Qi Jiang, Shanghai (CN); Keying Wu, Shanghai (CN); Xiaobo Zhang, Shanghai (CN)

(72) Inventors: Qi Jiang, Shanghai (CN); Keying Wu, Shanghai (CN); Xiaobo Zhang, Shanghai (CN)

(73) Assignee: SHANGHAI LANGBO COMMUNICATION TECHNOLOGY COMPANY LIMIIED, Shanghai (CN)

(*) Notice: Subject to any disclaimer, the term of this patent is extended or adjusted under 35 U.S.C. 154(b) by 77 days.

(21) Appl. No.: 17/465,878

(22) Filed: Sep. 3, 2021

(65) Prior Publication Data

US 2021/0400602 A1 Dec. 23, 2021

Related U.S. Application Data

(63) Continuation of application No. 16/885,296, filed on May 28, 2020, now Pat. No. 11,147,028.

(30) Foreign Application Priority Data

Jun. 10, 2019 (CN) .......................... 201910496193.7

(51) Int. Cl.
H04W 52/38 (2009.01)
H04W 52/24 (2009.01)
H04W 52/28 (2009.01)

(52) U.S. Cl.
CPC ....... *H04W 52/383* (2013.01); *H04W 52/242* (2013.01); *H04W 52/243* (2013.01); *H04W 52/281* (2013.01)

(58) Field of Classification Search
CPC ............. H04W 52/242; H04W 52/243; H04W 52/281; H04W 52/383
See application file for complete search history.

(56) References Cited

U.S. PATENT DOCUMENTS

2011/0038271 A1 2/2011 Shin
2014/0321389 A1 10/2014 Zhang
(Continued)

FOREIGN PATENT DOCUMENTS

CN 109644414 A 4/2019

OTHER PUBLICATIONS

Huawei "Feature lead summary for AI 7.2.4.7: NR control for LTE sidelink" 3GPP TSG RAN WG1 Meeting #97 R1-1907686 May 16, 2019.

(Continued)

*Primary Examiner* — Raymond S Dean

(57) ABSTRACT

The disclosure provides a method and a device in a node for wireless communication. A first node receives a first signal and a second signal, and the first node transmits a first information block and a second information block in a first time window. The first information block and the second information block are used for determining whether the first signal and the second signal are correctly received respectively; transmit power values of physical layer channels carrying the first information block and the second information block are both a first power value. Through the design in the disclosure, a transmit power of a feedback channel on a sidelink is associated with a priority; and when multiple feedback channels are transmitted in one same time window, a proper transmit power can be determined to optimize performances of the feedback channels on the sidelink.

20 Claims, 16 Drawing Sheets

(56) References Cited

U.S. PATENT DOCUMENTS

| | | | |
|---|---|---|---|
| 2018/0359711 A1 | 12/2018 | Akkarakaran | |
| 2019/0288816 A1* | 9/2019 | Ren | H04L 5/00 |
| 2019/0350045 A1* | 11/2019 | Lee | H04W 76/27 |
| 2020/0220694 A1* | 7/2020 | Khoryaev | H04L 1/1816 |
| 2020/0235868 A1* | 7/2020 | Yu | H04W 4/08 |
| 2020/0313825 A1* | 10/2020 | Ryu | H04L 1/1854 |
| 2020/0351032 A1* | 11/2020 | Wu | H04W 72/0406 |
| 2020/0351975 A1* | 11/2020 | Tseng | H04L 5/0055 |

OTHER PUBLICATIONS

First Office Action of Chinses patent application No. CN201910496193.7 dated Jun. 6, 2022.
First Search Report of Chinses patent application No. CN201910496193.7 dated May 30, 2022.
Notification to Grant Patent Right for Invention of Chinses patent application No. CN201910496193.7 dated Nov. 30, 2022.

* cited by examiner

METHOD AND DEVICE IN NODE FOR WIRELESS COMMUNICATION

CROSS REFERENCE TO RELATED APPLICATIONS

This application is a continuation of application of U.S. Pat. No. 16/885,296, filed on May 28, 2020, and claims the priority benefit of Chinese Patent Application No. CN201910496193.7, filed on Jun. 10, 2019, the full disclosure of which is incorporated herein by reference.

BACKGROUD

Technical Field

The disclosure relates to transmission methods and devices in wireless communication systems, and in particular to a method and a device for selecting a transmit power of a feedback channel on a sidelink in Internet of Things (IoT) or Vehicle-to-Everything (V2X) systems.

Related Art

In view of V2X services developing rapidly, 3GPP has also started the initiation of standards formulation and researches under NR framework. At present, 3GPP has accomplished the work of formulation of requirements orienting 5G V2X services and has written it into standards TS22.886. 3GPP defines four use case groups for 5G V2X services, including Vehicles Platnooning, Extended Sensors, Advanced Driving and Remote Driving. In present V2X systems, terminal devices are supported to feed back, through a Physical Sidelink Feedback Channel (PSFCH), a Hybrid Automatic Repeat request Acknowledgement (HARQ-ACK) for a Physical Sidelink Shared Channel (PSSCH) on a sidelink. Meanwhile, in present NR V2X, it is also determined to take a pathloss on a sidelink into the determination of a transmit power of a channel on the sidelink.

SUMMARY

In NR V2X systems, one terminal will keep communication with multiple terminals at the same time, thus the one terminal will feed back HARQ-ACKs to multiple terminals at the same time; however, when the multiple HARQ-ACKs are transmitted in a same slot, a transmitter of the HARQ-ACKs needs to consider what size of transmit power is employed to transmit the multiple HARQ-ACKs. Since pathlosses between the receivers of these HARQ-ACKs and the terminal may be different, it is needed to consider how to determine a transmit power value of the multiple HARQ-ACKs through the multiple pathlosses. Meanwhile, it is also needed to avoid interference problems between the multiple HARQ-ACKs.

In view of the above new application scenarios and requirements, the disclosure provides a solution. It should be noted that the embodiments of the first node, second node and third node of the disclosure and the characteristics in the embodiments may be applied to the base station if no conflict is incurred, and the embodiments of the fourth node in the disclosure and the characteristics in the embodiments may be applied to terminals. Meanwhile, the embodiments of the disclosure and the characteristics in the embodiments may be mutually combined arbitrarily if no conflict is incurred.

The disclosure provides a method in a first node for wireless communication, wherein the method includes:
receiving a first signal;
receiving a second signal; and
transmitting a first information block and a second information block in a first time window.

Herein, the first information block is used for determining whether the first signal is correctly received, and the second information block is used for determining whether the second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel.

In one embodiment, the above method has the following benefits: the first information block and the second information block are HARQ-ACKs for the first signal and the second signal respectively; when the first information block and the second information block are transmitted employing a same transmit power in one same time window, the transmit power is determined according to the configuration parameter and pathloss of the signal of higher priority, thereby ensuring the reception of HARQ-ACK of the signal of higher priority and avoiding interferences between frequency bands.

According to one aspect of the disclosure, the above method includes:
receiving a first signaling; and
receiving a second signaling.

Herein, the first signaling is used for determining at least one of time domain resources or frequency domain resources occupied by the first signal, and the second signaling is used for determining at least one of time domain resources or frequency domain resources occupied by the second signal; the first signaling includes the first field, and the second signaling includes the second field; the first signaling and the second signaling are both physical layer signalings.

According to one aspect of the disclosure, the above method is characterized in that: the first information block and the second information block are both transmitted in a candidate target channel, and a transmit power value of the candidate target channel is a first power value; or, the first information block and the second information block are transmitted in a first target channel and a second target channel respectively, and transmit power values of both the first target channel and the second target channel are the first power value.

According to one aspect of the disclosure, the above method is characterized in that: the method of employing the candidate target channel indicates that the first information block and the second information block are transmitted on one PSFCH through Code Division Multiplexing (CDM), thus the first information block and the second information block need to be transmitted with a uniform transmit power.

According to one aspect of the disclosure, the above method is further characterized in that: the method of employing the first target channel and the second target channel indicates that the first information block and the second information block are transmitted on two PSFCHs through Frequency Division Multiplexing (FDM); considering problems of frequency band leakage and Peak to Average Power Ratio (PAPR), the two PSFCHs also need to keep a same transmit power value.

In one embodiment, the above method has the following benefits: the scheme provided in the disclosure is applicable to both CDM and FDM.

According to one aspect of the disclosure, the above method is characterized in that: the phrase that the priority of the first signal and the priority of the second signal are used together for determining a first expected power value means that: when the priority of the first signal is higher than the priority of the second signal, a parameter set of a wireless link corresponding to the first signal is used for determining the first expected power value, and the parameter set of the wireless link corresponding to the first signal includes a pathloss of the wireless link corresponding to the first signal; when the priority of the first signal is lower than the priority of the second signal, a parameter set of a wireless link corresponding to the second signal is used for determining the first expected power value, and the parameter set of the wireless link corresponding to the second signal includes a pathloss of the wireless link corresponding to the second signal.

According to one aspect of the disclosure, the above method includes:

receiving a first reference signal; and
receiving a second reference signal.

Herein, the first reference signal is used for determining the pathloss of the wireless link corresponding to the first signal, and the second reference signal is used for determining the pathloss of the wireless link corresponding to the second signal.

According to one aspect of the disclosure, the above method includes:

receiving a third reference signal.

Herein, the third reference signal is used for determining a third reference power value, and the first power value is a smaller one of the first expected power value and the third reference power value; a transmitter of the third reference signal is non-colocated with a transmitter of the first signal, and the transmitter of the third reference signal is non-colocated with a transmitter of the second signal.

In one embodiment, the above method has the following benefits: the third reference signal is used for determining a pathloss of a cellular link; the above method ensures that the transmit power value on the sidelink does not cause interference to the cellular link.

The disclosure provides a method in a second node for wireless communication, wherein the method includes:

transmitting a first signal; and
receiving a first information block in a first time window.

Herein, the first information and a second information are both transmitted in the first time window, the first information block is used for determining whether the first signal is correctly received, and the second information block is used for determining whether a second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel.

According to one aspect of the disclosure, the above method includes:

transmitting a first signaling.

Herein, the first signaling is used for determining at least one of time domain resources or frequency domain resources occupied by the first signal, and the first signaling includes the first field; and the first signaling is a physical layer signaling.

According to one aspect of the disclosure, the above method is characterized in that: the first information block and the second information block are both transmitted in a candidate target channel, and a transmit power value of the candidate target channel is a first power value; or, the first information block and the second information block are transmitted in a first target channel and a second target channel respectively, and transmit power values of both the first target channel and the second target channel are the first power value.

According to one aspect of the disclosure, the above method is characterized in that: the phrase that the priority of the first signal and the priority of the second signal are used together for determining a first expected power value means that: when the priority of the first signal is higher than the priority of the second signal, a pathloss of a wireless link corresponding to the first signal is used for determining the first expected power value; when the priority of the first signal is not higher than the priority of the second signal, a pathloss of a wireless link corresponding to the second signal is used for determining the first expected power value.

According to one aspect of the disclosure, the above method includes:

transmitting a first reference signal.

Herein, the first reference signal is used for determining the pathloss of the wireless link corresponding to the first signal.

According to one aspect of the disclosure, the above method is characterized in that: a third reference signal is used for determining a first reference power value, and the first power value is a smaller one of the first expected power value and the first reference power value; a transmitter of the third reference signal is non-colocated with the second node, and the transmitter of the third reference signal is non-colocated with a transmitter of the second signal.

The disclosure provides a method in a third node for wireless communication, wherein the method includes:

transmitting a second signal; and
receiving a second information block in a first time window.

Herein, a first information and the second information are both transmitted in the first time window, the first information block is used for determining whether a first signal is correctly received, and the second information block is used for determining whether the second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel.

According to one aspect of the disclosure, the above method includes:

transmitting a second signaling.

Herein, the second signaling is used for determining at least one of time domain resources or frequency domain resources occupied by the second signal, and the second signaling includes the second field; and the second signaling is a physical layer signaling.

According to one aspect of the disclosure, the above method is characterized in that: the first information block and the second information block are both transmitted in a candidate target channel, and a transmit power value of the candidate target channel is a first power value; or, the first information block and the second information block are transmitted in a first target channel and a second target channel respectively, and transmit power values of both the first target channel and the second target channel are the first power value.

According to one aspect of the disclosure, the above method is characterized in that: the phrase that the priority of the first signal and the priority of the second signal are used together for determining a first expected power value means that: when the priority of the first signal is higher than the priority of the second signal, a pathloss of a wireless link corresponding to the first signal is used for determining the first expected power value; when the priority of the first signal is not higher than the priority of the second signal, a pathloss of a wireless link corresponding to the second signal is used for determining the first expected power value.

According to one aspect of the disclosure, the above method includes:

transmitting a second reference signal.

Herein, the second reference signal is used for determining the pathloss of the wireless link corresponding to the second signal.

According to one aspect of the disclosure, the above method is characterized in that: a third reference signal is used for determining a first reference power value, and the first power value is a smaller one of the first expected power value and the first reference power value; a transmitter of the third reference signal is non-colocated with the third node, and the transmitter of the third reference signal is non-colocated with a transmitter of the first signal.

The disclosure provides a method in a fourth node for wireless communication, wherein the method includes:

transmitting a third reference signal.

Herein, the third reference signal is used for determining a third reference power value, and a first power value is a smaller one of a first expected power value and the third reference power value; the first power value is both transmit power values of physical layer channels carrying a first information block and a second information block; the first information block is used for determining whether a first signal is correctly received, and the second information block is used for determining whether a second signal is correctly received; a priority of the first signal and a priority of the second signal are used together for determining the first expected power value, and the first power value is not greater than the first expected power value; a first field and a second field are used for indicating priorities of the first signal and the second signal respectively; the first field and the second field are both transmitted in a physical layer channel.

The disclosure provides a first node for wireless communication, wherein the method includes:

a first receiver, to receive a first signal;

a second receiver, to receive a second signal; and a first transmitter, to transmit a first information block and a second information block in a first time window.

Herein, the first information block is used for determining whether the first signal is correctly received, and the second information block is used for determining whether the second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel.

The disclosure provides a second node for wireless communication, wherein the method includes:

a second transmitter, to transmit a first signal; and a third receiver, to receive a first information block in a first time window.

Herein, the first information and a second information are both transmitted in the first time window, the first information block is used for determining whether the first signal is correctly received, and the second information block is used for determining whether a second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel.

The disclosure provides a third node for wireless communication, wherein the method includes:

a third transmitter, to transmit a second signal; and a fourth receiver, to receive a second information block in a first time window.

Herein, a first information and the second information are both transmitted in the first time window, the first information block is used for determining whether a first signal is correctly received, and the second information block is used for determining whether the second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel.

The disclosure provides a fourth node for wireless communication, wherein the method includes:

a fourth transmitter, to transmit a third reference signal.

Herein, the third reference signal is used for determining a third reference power value, and a first power value is a smaller one of a first expected power value and the third reference power value; the first power value is both transmit power values of physical layer channels carrying a first information block and a second information block; the first information block is used for determining whether a first signal is correctly received, and the second information block is used for determining whether a second signal is correctly received; a priority of the first signal and a priority of the second signal are used together for determining the first expected power value, and the first power value is not greater than the first expected power value; a first field and a second field are used for indicating priorities of the first signal and the second signal respectively; the first field and the second field are both transmitted in a physical layer channel.

In one embodiment, compared with conventional schemes, the disclosure has the following advantages.

The first information block and the second information block are HARQ-ACKs for the first signal and the second signal respectively; when the first information block and the second information block are transmitted employing a same transmit power in one same time window, the transmit power is determined according to the configuration parameter and pathloss of the signal of higher priority, thereby ensuring the reception of HARQ-ACK of the signal of higher priority and avoiding interferences between frequency bands.

The scheme provided in the disclosure is applicable to both scenarios that multiple HARQ-ACKs are CDM and FDM.

The third reference signal is used for determining a pathloss of a cellular link; the above method ensures that the transmit power value on the sidelink does not cause interference to the cellular link.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
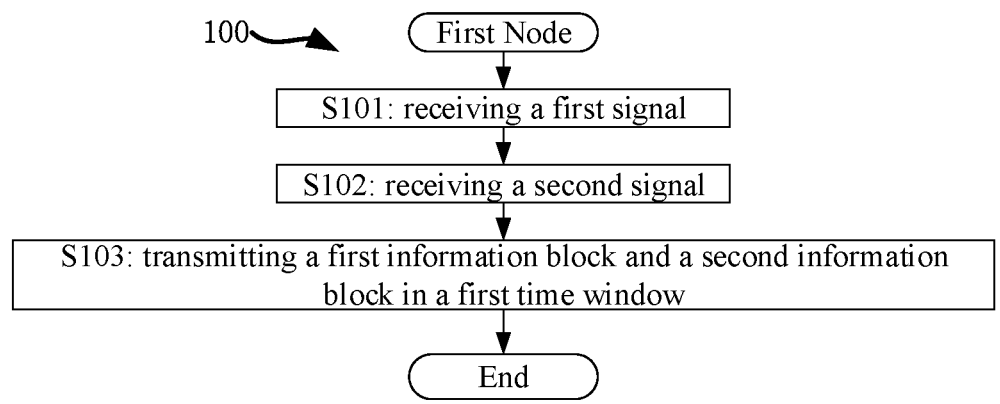
FIG. 1 is a flowchart of processing of a first node according to one embodiment of the disclosure.

Embodiment 1 illustrates a flowchart of processing of a first node, as shown in FIG. 1. In 100 shown in FIG. 1, each box represents one step. In Embodiment 1, the first node in the disclosure receives a first signal in S101, receives a second signal in S102, and transmits a first information block and a second information block in a first time window in S103.

In Embodiment 1, the first information block is used for determining whether the first signal is correctly received, and the second information block is used for determining whether the second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel.

In one embodiment, a physical layer channel occupied by the first signal includes a PSSCH.

In one embodiment, a physical layer channel occupied by the second signal includes a PSSCH.

In one embodiment, the first signal is transmitted in a first time unit, the second signal is transmitted in a second time unit, the first time unit and the second time unit are orthogonal in time domain.

In one embodiment, the first signal is transmitted in a first time unit set, the second signal is transmitted in a second time unit set, the first time unit set includes K1 time units, the second time unit set includes K2 time units, at least one of the K1 time units is different from at least one of the K2 time units, or at least one of the K2 time units is different from at least one of the K1 time units; the K1 and the K2 are both positive integers greater than 1.

In one embodiment, time domain resources occupied by the first signal are not completely overlapping with time domain resources occupied by the second signal.

In one embodiment, the first information block is a HARQ-ACK for the first signal.

In one embodiment, the second information block is a HARQ-ACK for the second signal.

In one embodiment, a physical layer channel carrying the first information block includes a PSFCH.

In one embodiment, a physical layer channel carrying the second information block includes a PSFCH.

In one embodiment, the first information block and the second information block are transmitted in one same PSFCH.

In one subembodiment, the first information block and the second information block are CDM in one same PSFCH.

In one subembodiment, the first information block and the second information block are multiplexing through different orthogonal sequences in one same PSFCH.

In one subembodiment, the first information block and the second information block are generated by different orthogonal sequences in one same PSFCH.

In one embodiment, the first information block and the second information block are transmitted in two PSFCHs respectively.

In one subembodiment, a PSFCH carrying the first information block and a PSFCH carrying the second information block are FDM in the first time window.

In one embodiment, the time unit in the disclosure refers to a slot, or the time unit in the disclosure refers to a subframe, or the time unit in the disclosure refers to a subslot.

In one embodiment, the first time window includes one time unit only.

In one embodiment, the first time window includes M consecutive multicarrier symbols, and the M is a positive integer less than 14.

In one embodiment, the first time window includes multiple time units.

In one embodiment, the first field is a Priority field in Sidelink Control Information (SCI).

In one embodiment, the first field includes 3 bits.

In one embodiment, the second field is a Priority field in SCI.

In one embodiment, the second field includes 3 bits.

In one embodiment, the first field indicates a ProSe Per-Packet Priority (PPPP) corresponding to the first signal.

In one embodiment, the first field is used for determining a PPPP corresponding to the first signal.

In one embodiment, the first field indicates a ProSe Per-Packet Reliability (PPPR) corresponding to the first signal.

In one embodiment, the first field is used for determining a PPPR corresponding to the first signal.

In one embodiment, the second field indicates a PPPP corresponding to the second signal.

In one embodiment, the second field indicates a PPPR corresponding to the second signal.

In one embodiment, the second field is used for determining a PPPP corresponding to the second signal.

In one embodiment, the second field is used for determining a PPPR corresponding to the second signal.

In one embodiment, the first signal is transmitted on a sidelink.

In one embodiment, the second signal is transmitted on a sidelink.

In one embodiment, the first information block is a feedback for a data channel on a sidelink.

In one embodiment, the second information block is a feedback for a data channel on a sidelink.

In one embodiment, the first information block further includes Channel State Information (CSI) for a first link, and the first link refers to a wireless link between the second node and the first node in the disclosure.

In one embodiment, the second information block further includes a CSI for a second link, and the second link refers to a wireless link between the third node and the first node in the disclosure.

In one embodiment, the first signal is a wireless radio.

In one embodiment, the first signal is baseband signal.

In one embodiment, the second signal is a wireless radio.

In one embodiment, the second signal is baseband signal.

In one embodiment, the priority of the first signal is higher than the priority of the second signal, and the first field is less than the second field.

In one embodiment, the priority of the first signal is lower than the priority of the second signal, and the first field is greater than the second field.

In one embodiment, the first power value is in unit of dBm, or the first power value is in unit of milliwatt.

In one embodiment, the first expected power value is in unit of dBm, or the first expected power value is in unit of milliwatt.

In one embodiment, the first signal is transmitted on a first link, the second signal is transmitted on a second link, and the phrase that the priority of the first signal and the priority of the second signal are used together for determining a first expected power value means that: a parameter set of a link corresponding to the signal of higher priority between the first signal and the second signal is used for determining the first expected power value.

In one subembodiment, the priority of the first signal is higher than the priority of the second signal, the parameter set of the first link is used for determining the first expected power value, and the parameter set includes a pathloss of the first link.

In one subembodiment, the priority of the first signal is lower than the priority of the second signal, the parameter set of the second link is used for determining the first expected power value, and the parameter set includes a pathloss of the second link.

In one subembodiment, the priority of the first signal is equal to the priority of the second signal, the parameter set of the first link is used for determining a first reference power value, the parameter set of the second link is used for determining a second reference power value, and a bigger one of the first reference power value and the second reference power value is set as the first expected power value.

In one subembodiment, the priority of the first signal is equal to the priority of the second signal, and the first node determines autonomously that the parameter set of the first link or the parameter set of the second link is used for determining the first expected power value.

In one embodiment, the physical layer channel carrying the first information block and the second information block occupies a positive integer number of Physical Resource Block(s) (PRB(s)) in frequency domain.

In one embodiment, the first signal is used for transmitting one Transport Block (TB).

In one embodiment, the second signal is used for transmitting one TB.

Embodiment 2

Figure 2:
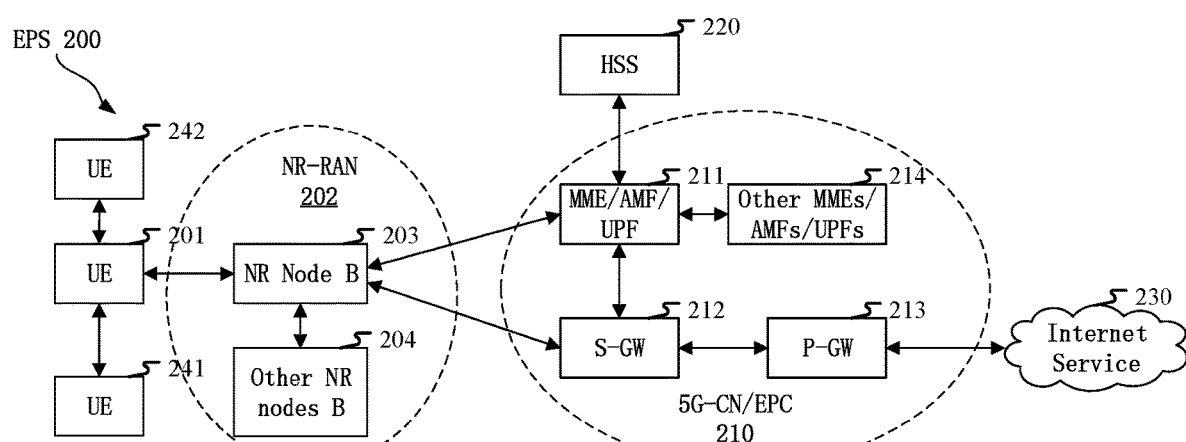
FIG. 2 is a diagram illustrating a network architecture according to one embodiment of the disclosure.

Embodiment 2 illustrates an example of a diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or some other appropriate terms. The EPS 200 may include one or more UEs 201, one UE 241 in sidelink communication with the UE 201, one UE 242 in sidelink communication with the UE 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks.

For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes a NR node (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-territorial network base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the first node in the disclosure.

In one embodiment, the UE 241 corresponds to the second node in the disclosure.

In one embodiment, the UE 242 corresponds to the third node in the disclosure.

In one embodiment, the gNB 203 corresponds to the fourth node in the disclosure.

In one embodiment, the air interface between the UE 201 and the gNB 203 is a Uu interface.

In one embodiment, the air interface between the UE 201 and the UE 241 is PC-5 interface.

In one embodiment, the air interface between the UE 201 and the UE 242 is PC-5 interface.

In one embodiment, the wireless link between the UE201 and the gNB 203 is a cellular link.

In one embodiment, the wireless link between the UE201 and the UE 241 is a sidelink.

In one embodiment, the wireless link between the UE201 and the UE 242 is a sidelink.

In one embodiment, the second node in the disclosure is one terminal within the coverage of the gNB 203.

In one embodiment, the second node in the disclosure is one terminal out of the coverage of the gNB 203.

In one embodiment, the third node in the disclosure is one terminal within the coverage of the gNB 203.

In one embodiment, the third node in the disclosure is one terminal out of the coverage of the gNB 203.

In one embodiment, the first node and the second node belong to one V2X pair.

In one embodiment, unicast V2X communication is performed between the first node and the second node, or groupcast V2X communication is performed between the first node and the second node.

In one embodiment, the first node and the third node belong to one terminal group.

In one embodiment, unicast V2X communication is performed between the first node and the third node, or groupcast V2X communication is performed between the first node and the third node.

In one embodiment, the first node is one car.
In one embodiment, the second node is one car.
In one embodiment, the third node is one car.
In one embodiment, the first node is one vehicle.
In one embodiment, the second node is one vehicle.
In one embodiment, the third node is one car.
In one embodiment, the fourth node is one base station.
In one embodiment, the first node is one Road Side Unit (RSU).

In one embodiment, the first node is a group header of one terminal group.

Embodiment 3

Figure 3:
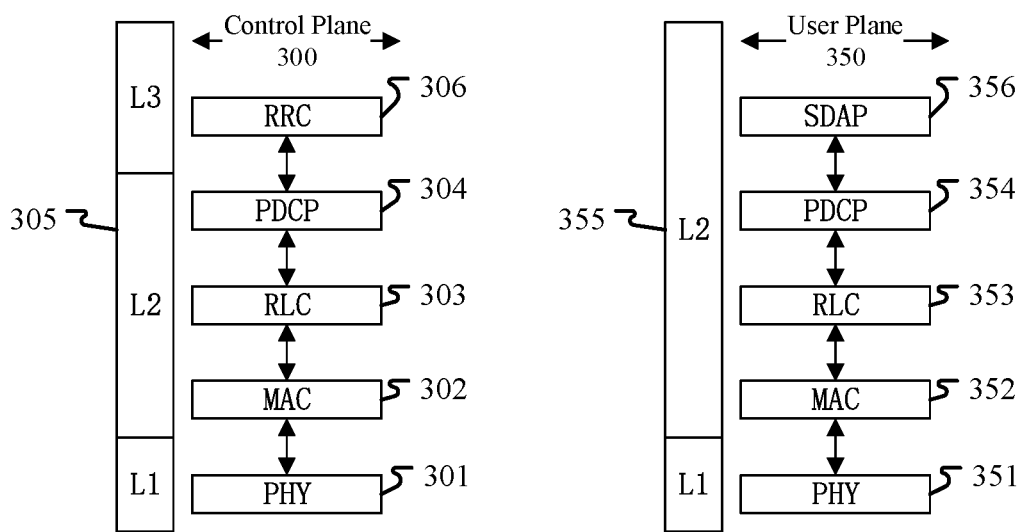
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3. FIG. 3 is a diagram illustrating an embodiment of a radio protocol architecture of a user plane 350 and a control plane 300. In FIG. 3, the radio protocol architecture of a control plane 300 between a first communication node equipment (UE, gNB or RSU in V2X) and a second communication node equipment (gNB, UE or RSU in V2X) or between two UEs is illustrated by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the links between the first communication node equipment and the second communication node equipment and between two UEs. The L2 Layer 305 includes a Medium Access Control (MAC) sublayer 302, a Radio Link Control (RLC) sublayer 303, and a Packet Data Convergence Protocol (PDCP) sublayer 304, which are terminated at the second communication node equipment. The PDCP sublayer 304 provides multiplexing between different radio bearers and logical channels. The PDCP sublayer 304 also provides security by encrypting packets and provides support for handover of the first communication node equipment between second communication node equipments. The RLC sublayer 303 provides segmentation and reassembling of higher-layer packets, retransmission of lost packets, and reordering of lost packets to as to compensate for out-oforder reception due to HARQ. The MAC sublayer 302 provides multiplexing between logical channels and transport channels. The MAC sublayer 302 is also responsible for allocating various radio resources (i.e., resource blocks) in one cell among the first communication node equipment. The MAC sublayer 302 is also in charge of HARQ operations. The RRC sublayer 306 in the Layer 3 (L3 layer) in the control plane 300 is responsible for acquiring radio resources (i.e. radio bearers) and configuring lower layers using an RRC signaling between the second communication node equipment and the first communication node equipment. The radio protocol architecture of the user plane 350 includes a Layer 1 (L1 layer) and a Layer 2 (L2 layer); the radio protocol architecture for the first communication node equipment and the second communication node equipment in the user plane 350 on the PHY 351, the PDCP sublayer 354 in the L2 Layer 355, the RLC sublayer 353 in the L2 Layer 355 and the MAC sublayer 352 in the L2 Layer 355 is substantially the same as the radio protocol architecture on corresponding layers and sublayers in the control plane 300, with the exception that the PDCP sublayer 354 also provides header compression for higher-layer packets so as to reduce radio transmission overheads. The L2 Layer 355 in the user plane 350 further includes a Service Data Adaptation Protocol (SDAP) sublayer 356; the SDAP sublayer 356 is in charge of mappings between QoS flows and Data Radio Bearers (DRBs), so as to support diversification of services. Although not shown, the first communication node equipment may include several higher layers above the L2 Layer 355, including a network layer (i.e. IP layer) terminated at the P-GW on the network side and an application layer terminated at the other end (i.e. a peer UE, a server, etc.) of the connection.

In one embodiment, the radio protocol architecture shown in FIG. 3 is applicable to the first node in the disclosure.

In one embodiment, the radio protocol architecture shown in FIG. 3 is applicable to the second node in the disclosure.

In one embodiment, the radio protocol architecture shown in FIG. 3 is applicable to the third node in the disclosure.

In one embodiment, the radio protocol architecture shown in FIG. 3 is applicable to the fourth node in the disclosure.

In one embodiment, the first signal is generated on the PHY 301 or the PHY 351.

In one embodiment, the first signal is generated on the MAC 352 or the MAC 302.

In one embodiment, the second signal is generated on the PHY 301 or the PHY 351.

In one embodiment, the second signal is generated on the MAC 352 or the MAC 302.

In one embodiment, the first signaling is generated on the PHY 301 or the PHY 351.

In one embodiment, the second signaling is generated on the PHY 301 or the PHY 351.

In one embodiment, the first reference signal is generated on the PHY 301 or the PHY 351.

In one embodiment, the second reference signal is generated on the PHY 301 or the PHY 351.

In one embodiment, the third reference signal is generated on the PHY 301 or the PHY 351.

Embodiment 4

Figure 4:
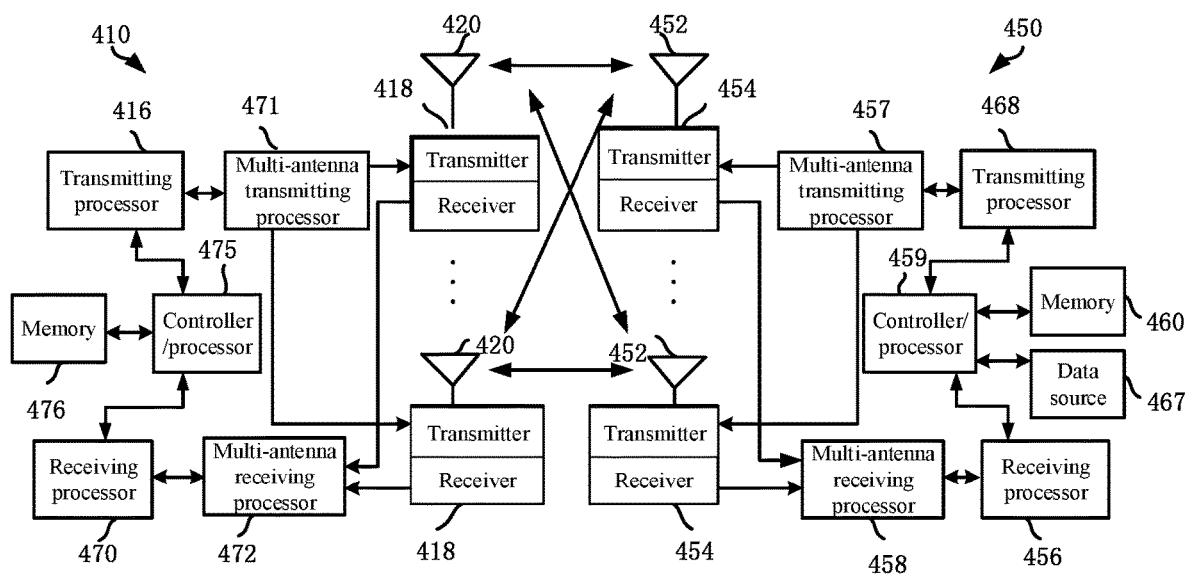
FIG. 4 is a diagram illustrating a first communication equipment and a second communication equipment according to one embodiment of the disclosure.

Embodiment 4 illustrates a diagram of a first communication equipment and a second communication equipment according to the disclosure, as shown in FIG. 4. FIG. 4 is a block diagram of a first communication equipment 450 and a second communication equipment 410 that are in communication with each other in an access network.

The first communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication equipment 410 to the first communication equipment 450, at the second communication equipment 410, a higher-layer packet from a core network is provided to the controller/processor 475. The controller/processor 475 provides functions of Layer 2. In the transmission from the second communication equipment 410 to the first communication equipment 450, the controller/processor 475 provides header compression, encryption, packet segmentation and reordering, multiplexing between a logical channel and a transport channel, and a radio resource allocation for the first communication equipment 450 based on various priority metrics. The controller/processor 475 is also in charge of retransmission of lost packets, and signalings to the first communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the first communication equipment 450 and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with transmitting analog precoding/beamforming. Each transmitter 418 converts a baseband multicarrier symbol stream provided by the multi-antenna transmitting processor 471 into a radio frequency stream and then provides it to different antennas 420.

In a transmission from the second communication equipment 410 to the first communication equipment 450, at the first communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 with receiving analog precoding/beamforming. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the first communication equipment 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the second communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In the transmission from the second communication equipment 410 to the first communication equipment 450, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In a transmission from the first communication equipment 450 to the second communication equipment 410, at the first communication equipment 450, the data source 467 provides a higher-layer packet to the controller/processor 459. The data source 467 illustrates all protocol layers above the L2 layer. Similar as the transmitting function of the second communication equipment 410 described in the transmission from the second communication equipment 410 to the first communication equipment 450, the controller/processor 459 provides header compression, encryption, packet segmentation and reordering, and multiplexing between a logical channel and a transport channel based on radio resource allocation so as to provide the functions of L2 layer used for the control plane and user plane. The controller/processor 459 is also in charge of retransmission of lost packets, and signalings to the second communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the first communication equipment 450 to the second communication equipment 410, the function of the second communication equipment 410 is similar as the receiving function of the first communication equipment 450 described in the transmission from second communication equipment 410 to the first communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In the transmission from the first communication equipment 450 to the second communication equipment 410, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network.

In one embodiment, the first communication equipment 450 includes at least one processor and at least one memory. The at least one memory includes computer program codes. The at least one memory and the computer program codes are configured to be used in collaboration with the at least one processor. The first communication equipment 450 at least receives a first signal, receives a second signal, and transmits a first information block and a second information block in a first time window; the first information block is used for determining whether the first signal is correctly received, and the second information block is used for determining whether the second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel.

In one embodiment, the first communication equipment 450 includes a memory that stores a computer readable instruction program. The computer readable instruction program generates an action when executed by at least one processor. The action includes: receiving a first signal, receiving a second signal, and transmitting a first information block and a second information block in a first time window; the first information block is used for determining whether the first signal is correctly received, and the second information block is used for determining whether the second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits a first signal, and receives a first information block in a first time window; the first information and a second information are both transmitted in the first time window, the first information block is used for determining whether the first signal is correctly received, and the second information block is used for determining whether a second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel.

In one embodiment, the second communication equipment 410 includes a memory that stores a computer readable instruction program. The computer readable instruction program generates an action when executed by at least one processor. The action includes: transmitting a first signal, and receiving a first information block in a first time window; the first information and a second information are both transmitted in the first time window, the first information block is used for determining whether the first signal is correctly received, and the second information block is used for determining whether a second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits a second signal, and receives a second information block in a first time window; a first information and the second information are both transmitted in the first time window, the first information block is used for determining whether a first signal is correctly received, and the second information block is used for determining whether the second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel.

In one embodiment, the second communication equipment 410 includes a memory that stores a computer readable instruction program. The computer readable instruction program generates an action when executed by at least one processor. The action includes: transmitting a second signal, and receiving a second information block in a first time window; a first information and the second information are both transmitted in the first time window, the first information block is used for determining whether a first signal is correctly received, and the second information block is used for determining whether the second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits a third reference signal; the third reference signal is used for determining a third reference power value, and a first power value is a smaller one of a first expected power value and the third reference power value; the first power value is both transmit power values of physical layer channels carrying a first information block and a second information block; the first information block is used for determining whether a first signal is correctly received, and the second information block is used for determining whether a second signal is correctly received; a priority of the first signal and a priority of the second signal are used together for determining the first expected power value, and the first power value is not greater than the first expected power value; a first field and a second field are used for indicating priorities of the first signal and the second signal respectively; the first field and the second field are both transmitted in a physical layer channel.

In one embodiment, the second communication equipment 410 includes a memory that stores a computer readable instruction program. The computer readable instruction program generates an action when executed by at least one processor. The action includes: transmitting a third reference signal; the third reference signal is used for determining a third reference power value, and a first power value is a smaller one of a first expected power value and the third reference power value; the first power value is both transmit power values of physical layer channels carrying a first information block and a second information block; the first information block is used for determining whether a first signal is correctly received, and the second information block is used for determining whether a second signal is correctly received; a priority of the first signal and a priority of the second signal are used together for determining the first expected power value, and the first power value is not greater than the first expected power value; a first field and a second field are used for indicating priorities of the first signal and the second signal respectively; the first field and the second field are both transmitted in a physical layer channel.

In one embodiment, the first communication equipment 450 corresponds to the first node in the disclosure.

In one embodiment, the second communication equipment 410 corresponds to the second node in the disclosure.

In one embodiment, the second communication equipment 410 corresponds to the third node in the disclosure.

In one embodiment, the second communication equipment 410 corresponds to the fourth node in the disclosure.

In one embodiment, the first communication equipment 450 is one UE.

In one embodiment, the second communication equipment 410 is one UE.

In one embodiment, at least one of the antenna 452, the receiver 454, the multiantenna receiving processor 458, the receiving processor 456 or the controller/processor 459 is used for receiving a first signal; and at least one of the antenna 420, the transmitter 418, the multiantenna transmitting processor 471, the transmitting processor 416 or the controller/processor 475 is used for transmitting a first signal.

In one embodiment, at least one of the antenna 452, the receiver 454, the multiantenna receiving processor 458, the receiving processor 456 or the controller/processor 459 is used for receiving a second signal; and at least one of the antenna 420, the transmitter 418, the multiantenna transmitting processor 471, the transmitting processor 416 or the controller/processor 475 is used for transmitting a second signal.

In one embodiment, at least one of the antenna 452, the transmitter 454, the multiantenna transmitting processor 457, the transmitting processor 468 or the controller/processor 459 is used for transmitting a first information block and a second information block in a first time window.

In one embodiment, at least one of the antenna 420, the receiver 418, the multiantenna receiving processor 472, the receiving processor 470 or the controller/processor 475 is used for receiving a first information block in a first time window.

In one embodiment, at least one of the antenna 420, the receiver 418, the multiantenna receiving processor 472, the receiving processor 470 or the controller/processor 475 is used for receiving a second information block in a first time window.

In one embodiment, at least one of the antenna 452, the receiver 454, the multiantenna receiving processor 458, the receiving processor 456 or the controller/processor 459 is used for receiving a first signaling; and at least one of the antenna 420, the transmitter 418, the multiantenna transmitting processor 471, the transmitting processor 416 or the controller/processor 475 is used for transmitting a first signaling.

In one embodiment, at least one of the antenna 452, the receiver 454, the multiantenna receiving processor 458, the receiving processor 456 or the controller/processor 459 is used for receiving a second signaling; and at least one of the antenna 420, the transmitter 418, the multiantenna transmitting processor 471, the transmitting processor 416 or the controller/processor 475 is used for transmitting a second signaling.

In one embodiment, at least one of the antenna 452, the receiver 454, the multiantenna receiving processor 458, the receiving processor 456 or the controller/processor 459 is used for receiving a first reference signal; and at least one of the antenna 420, the transmitter 418, the multiantenna transmitting processor 471, the transmitting processor 416 or the controller/processor 475 is used for transmitting a first reference signal.

In one embodiment, at least one of the antenna 452, the receiver 454, the multiantenna receiving processor 458, the receiving processor 456 or the controller/processor 459 is used for receiving a second reference signal; and at least one of the antenna 420, the transmitter 418, the multiantenna transmitting processor 471, the transmitting processor 416 or the controller/processor 475 is used for transmitting a second reference signal.

In one embodiment, at least one of the antenna 452, the receiver 454, the multiantenna receiving processor 458, the receiving processor 456 or the controller/processor 459 is used for receiving a third reference signal; and at least one of the antenna 420, the transmitter 418, the multiantenna transmitting processor 471, the transmitting processor 416 or the controller/processor 475 is used for transmitting a third reference signal.

Embodiment 5

Figure 5:
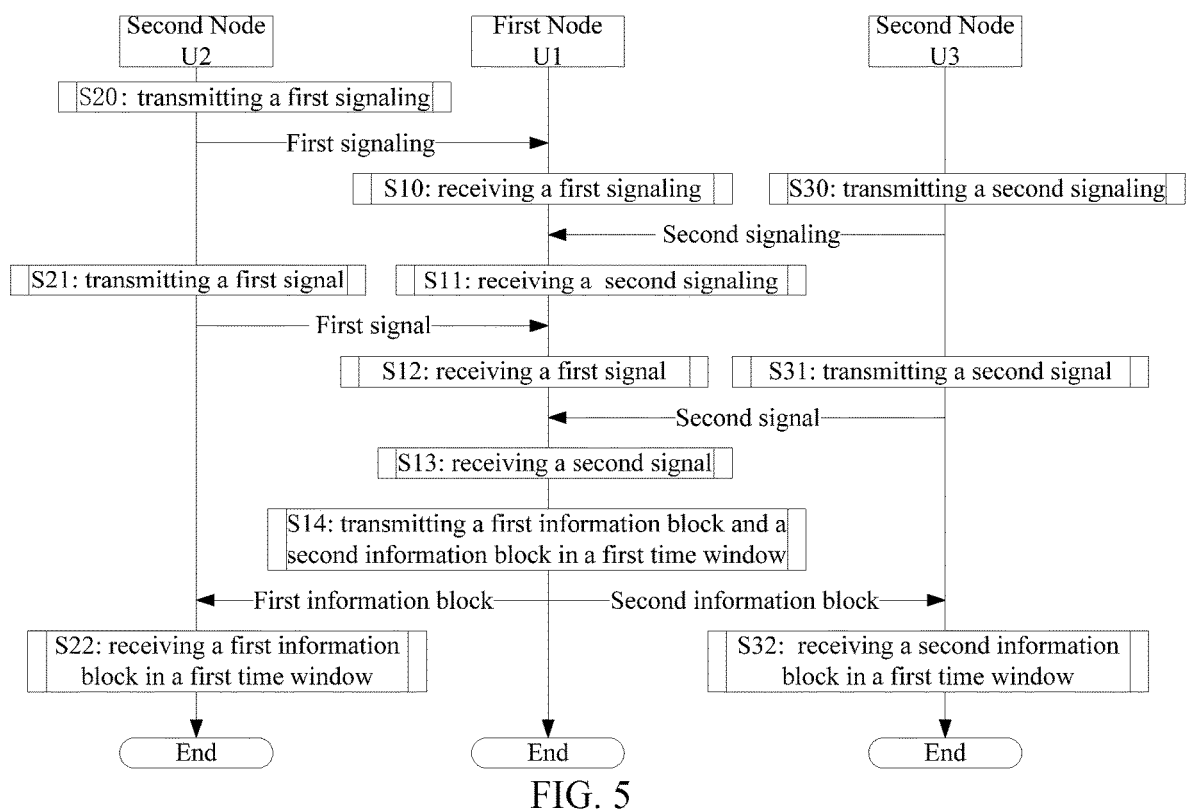
FIG. 5 is a flowchart of a first signaling according to one embodiment of the disclosure.

Embodiment 5 illustrates a flowchart of a first signaling, as shown in FIG. 5. In FIG. 5, a first node U1 performs communication with a second node U2 through a sidelink, and the first node U1 performs communication with a third node U3 through a sidelink.

The first node U1 receives a first signaling in S10, receives a second signaling in S11, receives a first signal in S12, receives a second signal in S13, and transmits a first information block and a second information block in a first time window in S14.

The second node U2 transmits a first signaling in S20, transmits a first signal in S21, and receives a first information block in a first time window in S22.

The third node U3 transmits a second signaling in S30, transmits a second signal in S31, and receives a second information block in a first time window in S32.

In Embodiment 5, the first information block is used for determining whether the first signal is correctly received, and the second information block is used for determining whether the second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel; the first signaling is used for determining at least one of time domain resources or frequency domain resources occupied by the first signal, and the second signaling is used for determining at least one of time domain resources or frequency domain resources occupied by the second signal; the first signaling includes the first field, and the second signaling includes the second field; the first signaling and the second signaling are both physical layer signalings.

In one embodiment, the first signaling is an SCI.

In one embodiment, the second signaling is an SCI.

In one embodiment, the first signaling is used for scheduling the first signal.

In one embodiment, the second signaling is used for scheduling the second signal.

In one embodiment, the first signaling is used for indicating at least one of a Modulation and Coding Status (MCS) or a Redundancy Version (RV) employed by the first signal.

In one embodiment, the first signaling is used for indicating a HARQ process number employed by the first signal.

In one embodiment, the second signaling is used for indicating at least one of an MCS or an RV employed by the second signal.

In one embodiment, the second signaling is used for indicating a HARQ process number employed by the second signal.

In one embodiment, the first signaling indicates time domain resources occupied by the first signal, and the time domain resources occupied by the first signal are used for determining time domain resources occupied by the first information block.

In one embodiment, the second signaling indicates time domain resources occupied by the second signal, and the time domain resources occupied by the second signal are used for determining time domain resources occupied by the second information block.

In one embodiment, the first signaling is used for indicating time domain resources occupied by the first information block.

In one embodiment, the second signaling is used for indicating time domain resources occupied by the second information block.

In one embodiment, the first information block and the second information block are both transmitted in a candidate target channel, and a transmit power value of the candidate target channel is the first power value; or the first information block and the second information block are transmitted in a first target channel and a second target channel respectively, and transmit power values of both the first target channel and the second target channel are the first power value.

In one subembodiment, the candidate target channel is a PSFCH.

In one subembodiment, the first target channel is a PSFCH.

In one subembodiment, the second target channel is a PSFCH.

In one subembodiment, the first target channel and the second target channel are FDM.

In one subembodiment, at least one given multicarrier symbol is occupied by both the first target channel and the second target channel.

In one embodiment, the multicarrier symbol in the disclosure is an Orthogonal Frequency Division Multiplexing (OFDM) symbol.

In one embodiment, the multicarrier symbol in the disclosure is a Single-Carrier Frequency Division Multiple Access (SC-FDMA) symbol.

In one embodiment, the multicarrier symbol in the disclosure is a Filter Bank Multi Carrier (FBMC) symbol.

In one embodiment, the multicarrier symbol in the disclosure is an OFDM symbol including a Cyclic Prefix (CP).

In one embodiment, the multicarrier symbol in the disclosure is one of Discrete Fourier Transform Spreading Orthogonal Frequency Division Multiplexing (DFT-s-OFDM) symbols including a CP.

In one embodiment, the phrase that the priority of the first signal and the priority of the second signal are used together for determining a first expected power value means that: when the priority of the first signal is higher than the priority of the second signal, a parameter set of a wireless link corresponding to the first signal is used for determining the first expected power value, and the parameter set of the wireless link corresponding to the first signal includes a pathloss of the wireless link corresponding to the first signal; when the priority of the first signal is lower than the priority of the second signal, a parameter set of a wireless link corresponding to the second signal is used for determining the first expected power value, and the parameter set of the wireless link corresponding to the second signal includes a pathloss of the wireless link corresponding to the second signal.

In one embodiment, when the priority of the first signal is equal to the priority of the second signal, the parameter set of a wireless link corresponding to the first signal is used for determining a first reference power value, the parameter set of a wireless link corresponding to second first signal is used for determining a second reference power value, and a bigger one of the first reference power value and the second reference power value is set as the first expected power value.

In one embodiment, when the priority of the first signal is equal to the priority of the second signal, and the first node determines autonomously that the parameter set of a wireless link corresponding to the first signal or the parameter set of a wireless link corresponding to second signal is used for determining the first expected power value.

In one embodiment, a wireless link corresponding to the first signal corresponds to a first link, and the first link is a wireless link from the first node to the second node in the disclosure.

In one embodiment, a wireless link corresponding to the second signal corresponds to a second link, and the second link is a wireless link from the first node to the third node in the disclosure.

In one embodiment, the parameter set of a wireless link corresponding to the first signal is a first parameter set; the first parameter set includes at least one of a first target power value $P_1$ or a first compensation factor $\alpha_1$; the $P_1$ is in unit of dBm, or the $P_1$ is in unit of milliwatt; and the $\alpha_1$ is a real number not less than 0 but not greater than 1.

In one embodiment, the parameter set of a wireless link corresponding to the second signal is a second parameter set; the second parameter set includes at least one of a second target power value $P_2$ or a second compensation factor $\alpha_2$; the $P_2$ is in unit of dBm, or the $P_2$ is in unit of milliwatt; and the $\alpha_2$ is a real number not less than 0 but not greater than 1.

In one embodiment, a pathloss of the first link is $PL_1$, a pathloss of the second link is $PL_2$, the $PL_1$ is in unit of dB, and the $PL_2$ is in unit of dB.

In one embodiment, the first expected power value is equal to $P_E$, the $P_E$ is determined through the following formula, where the parameter M is related to a bandwidth of frequency domain resources occupied by a physical channel carrying the first information block and(or) the second information block.

$$P_E=10 \log(M)+P_i+\alpha_i \cdot PL_i$$

In one subembodiment, the priority of the first signal is higher than the priority of the second signal, the $P_i$ is equal to $P_1$, the $\alpha_i$ is equal to $\alpha_1$, and the $PL_i$ is equal to $PL_1$.

In one subembodiment, the priority of the first signal is lower than the priority of the second signal, the $P_i$ is equal to $P_2$, the $\alpha_i$ is equal to $\alpha_2$, and the $PL_i$ is equal to $PL_2$ In one subembodiment, the priority of the first signal is equal to the priority of the second signal, the first node selects autonomously one from $P_1$ and $P_2$ as $P_i$, selects a corresponding one from $\alpha_1$ and $\alpha_2$ as $\alpha_i$, selects a corresponding one from $PL_1$ and $PL_2$ as $PL_i$, and calculates the first expected power according to the above formula.

In one subembodiment, the priority of the first signal is equal to the priority of the second signal, the first node calculates a first reference power value with $P_1$, $\alpha_1$ and $PL_1$ according to the above formula, and calculates a second reference power value with $P_2$, $\alpha_2$ and $PL_2$ according to the above formula, and a bigger one of the first reference power value and the second reference power value is set as the first expected power value.

Embodiment 6

Figure 6:
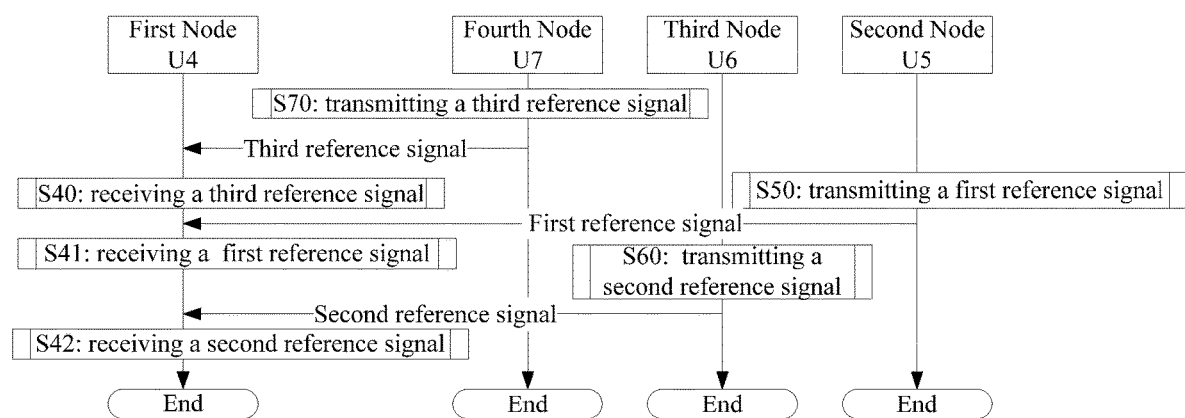
FIG. 6 is a flowchart of a first reference signal according to one embodiment of the disclosure.

Embodiment 6 illustrates a flowchart of a first reference signal, as shown in FIG. 6. In FIG. 6, a first node U4 performs communication with a second node U5 through a sidelink, the first node U4 performs communication with a third node U6 through a sidelink, and the first node U4 performs communication with a fourth node U7 through a cellular link.

The first node U4 receives a third reference signal in S40, receives a first reference signal in S41 and receives a second reference signal in S42.

The second node U5 transmits a first reference signal in S50.

The third node U6 transmits a second reference signal in S60.

The fourth node U7 transmits a third reference signal in S70.

In Embodiment 6, the first reference signal is used for determining a pathloss of a wireless link corresponding to the first signal in the disclosure, and the second reference signal is used for determining a pathloss of a wireless link corresponding to the second signal in the disclosure; the third reference signal is used for determining a third reference power value, the first power value in the disclosure is a smaller one of the first expected power value and the third reference power value; a transmitter of the third reference signal is non-colocated with a transmitter of the first signal, and the transmitter of the third reference signal is non-colocated with a transmitter of the second signal.

In one embodiment, the first reference signal is a Channel State Information Reference Signal (CSI-RS) on a sidelink.

In one embodiment, the second reference signal is a CSI-RS on a sidelink.

In one embodiment, the first signal includes the first reference signal.

In one embodiment, the second signal includes the second reference signal.

In one embodiment, the first reference signal includes a CSI-RS from the second node to the first node.

In one embodiment, the second reference signal includes a CSI-RS from the third node to the first node.

In one embodiment, the third reference signal is transmitted on a third link, and the third link is a wireless link between the fourth node U7 and the first node U4.

In one embodiment, the third reference signal is a CSI-RS on a Uu link.

In one embodiment, a transmitter of the third reference signal is a base station.

In one embodiment, a transmitter of the first signal is one terminal, and a transmitter of the second signal is another terminal.

In one embodiment, the third reference signal is used for determining a third pathloss, and the third pathloss is used for determining the third reference power value.

In one embodiment, the third link corresponds to a third parameter set, the third parameter set includes at least one of a third target power value $P_3$ or a third compensation factor $\alpha_3$, the third reference power value $P_{Uu}$ is determined through the following formula, where a parameter M is related to a bandwidth of frequency domain resources occupied by a physical channel carrying the first information block and(or) the second information block; $PL_3$ is the third pathloss, the $P_3$ is in unit of dBm, or the $P_3$ is in unit of milliwatt; and the $\alpha_3$ is a real number not less than 0 but not greater than 1.

$$P_{Uu}=10\log(M)+P_3+\alpha_3 \cdot PL_3$$

In one embodiment, the phrase that a transmitter of the third reference signal is non-colocated with a transmitter of the first signal means that: a transmitter of the third reference signal and a transmitter of the first signal are located at different geographical positions.

In one embodiment, the phrase that a transmitter of the third reference signal is non-colocated with a transmitter of the first signal means that: a transmitter of the third reference signal and a transmitter of the first signal have no wired connection therebetween.

In one embodiment, the phrase that a transmitter of the third reference signal is non-colocated with a transmitter of the second signal means that: a transmitter of the third reference signal and a transmitter of the second signal are located at different geographical positions.

In one embodiment, the phrase that a transmitter of the third reference signal is non-colocated with a transmitter of the second signal means that: a transmitter of the third reference signal and a transmitter of the second signal have no wired connection therebetween.

Embodiment 7

Figure 7:
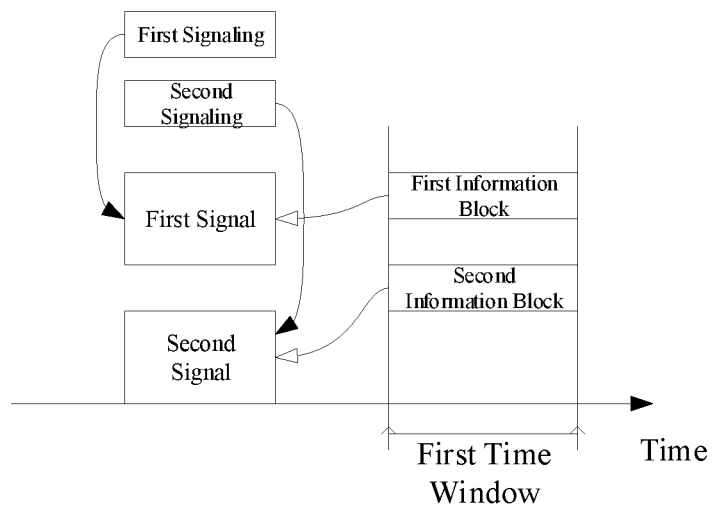
FIG. 7 is a diagram illustrating a first time window according to one embodiment of the disclosure.

Embodiment 7 illustrates a diagram of a first time window, as shown in FIG. 6. In FIG. 6, the first node in the disclosure receives a first signaling and a first signal, receives a second signaling and a second signal, and transmits a first information block and a second information block in a first time window; the dark arrow in FIG. 7 represents scheduling, and the white arrow represents feedback.

In one embodiment, the first signaling and the first signal are transmitted in one same time unit.

In one embodiment, the first signaling and the first signal are FDM.

In one embodiment, the second signaling and the second signal are transmitted in one same time unit.

In one embodiment, the secod signaling and the second signal are FDM.

In one embodiment, the first signaling is used for indicating the first time window.

In one embodiment, the second signaling is used for indicating the first time window.

In one embodiment, a time interval from a time unit occupied by the first signal to the first time window is fixed, or a time interval from a time unit occupied by the first signal to the first time window is configured through a higher layer signaling.

In one embodiment, a time interval from a time unit occupied by the second signal to the first time window is fixed, or a time interval from a time unit occupied by the second signal to the first time window is configured through a higher layer signaling.

Embodiment 8

Figure 8:
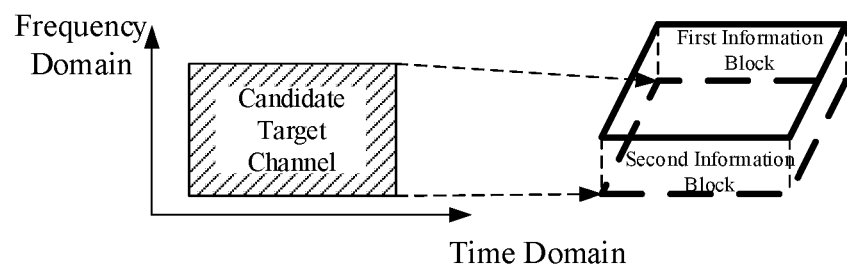
FIG. 8 is a diagram illustrating a candidate target channel according to one embodiment of the disclosure.

Embodiment 8 illustrates a diagram of a candidate target channel, as shown in FIG. 8. In FIG. 8, a first information block and a second information block together occupy the candidate target channel, a bold-line parallelogram and a dash-line parallelogram correspond to an air interface resource set occupied by the first information block and an air interface resource set occupied by the second information block respectively; the candidate target channel includes M1 air interface resource sets; the first information block and the second information block occupy two different air interface resource sets among the M1 air interface resource sets respectively; and the M1 is a positive integer greater than 1.

In one embodiment, the M1 air interface resource sets correspond to M1 code domain resources or M1 multiaccess signatures respectively.

In one embodiment, the M1 air interface resource sets correspond to M1 orthogonal sequences respectively.

In one embodiment, any two of the M1 air interface resource sets correspond to orthogonal code domain resources or multiaccess signatures.

In one embodiment, at least two of the M1 air interface resource sets correspond to orthogonal code domain resources or multiaccess signatures.

In one embodiment, the candidate target channel occupies one or more time units in time domain, and the candidate target channel occupies a subcarrier corresponding to a positive integer umber of PRB(s) in frequency domain.

In one embodiment, the first information block is generated by a first sequence, the second information block is generated by a second sequence, and the first sequence is orthogonal to the second sequence.

In one subembodiment, a second node employs a second identifier, the second identifier is used for determining the first sequence; a third node employs a third identifier, the third identifier is used for determining the second sequence.

Embodiment 9

Figure 9:
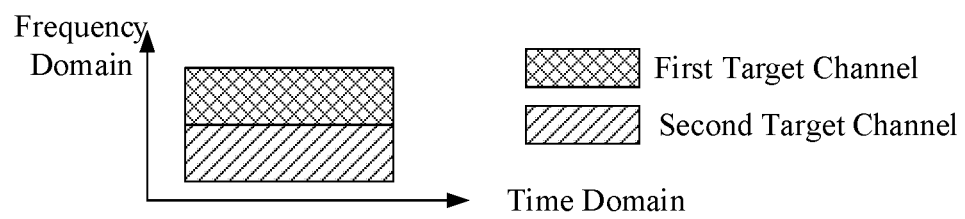
FIG. 9 is a diagram illustrating a first target channel and a second target channel according to one embodiment of the disclosure.

Embodiment 9 illustrates a diagram of a first target channel and a second target channel, as shown in FIG. 9. In FIG. 9, the first target channel and the second target channel are both PSFCHs; the PSFCH corresponding to the first target channel is used for feeding back a PSSCH coming from the second node only, and the PSFCH corresponding to the second target channel is used for feeding back a PSSCH coming from the third node only.

In one embodiment, the first target channel and the second target channel occupy a same number of PRB(s) in frequency domain.

In one embodiment, the first target channel and the second target channel occupy a same number of subcarrier(s) in frequency domain.

In one embodiment, the first target channel and the second target channel are FDM.

In one embodiment, the first target channel and the first signal in the disclosure occupy same frequency domain resources.

In one embodiment, the second target channel and the second signal in the disclosure occupy same frequency domain resources.

In one embodiment, the first signaling is used for indicating frequency domain resources occupied by the first target channel.

In one embodiment, the second signaling is used for indicating frequency domain resources occupied by the second target channel.

In one embodiment, frequency domain resources occupied by the first signal are used for indicating frequency domain resources occupied by the first target channel.

In one embodiment, frequency domain resources occupied by the second signal are used for indicating frequency domain resources occupied by the second target channel.

In one embodiment, a time interval between the first time window and time domain resources occupied by the first signal is fixed.

In one embodiment, a time interval between the first time window and time domain resources occupied by the second signal is fixed.

In one embodiment, the first signal and the second signal are transmitted in a same time unit.

Embodiment 10

Figure 10:
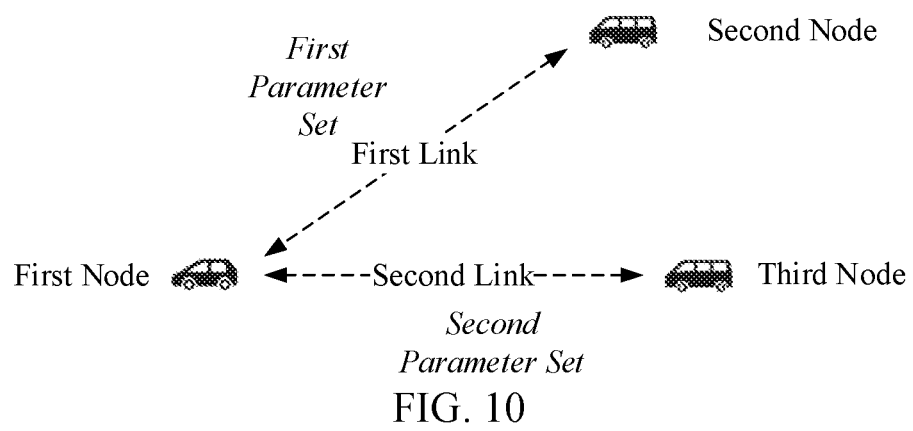
FIG. 10 is a diagram illustrating an application scenario according to one embodiment of the disclosure.

Embodiment 10 illustrates a diagram of an application scenario, as shown in FIG. 10. In FIG. 10, a priority of the first signal and a priority of the second signal are used together for determining a target parameter set, and the target parameter set is used for determining the first expected power value; in FIG. 10, a first link corresponds to a wireless link between the first node and the second node in the disclosure, and a second link corresponds to a wireless link between the first node and the third node in the disclosure; the first link corresponds to a first parameter set, and the second link corresponds to a second parameter set; a relationship between the priority of the first signal and the priority of the second signal is used for determining that the target parameter set is the first parameter set or the second parameter set.

In one embodiment, the priority of the first signal is higher than the priority of the second signal, and the target parameter set is the first parameter set.

In one embodiment, the priority of the first signal is lower than the priority of the second signal, and the target parameter set is the second parameter set.

In one embodiment, the priority of the first signal is equal to the priority of the second signal, and the first node determines autonomously that the first parameter set or the second parameter is selected as the target parameter set to determine the first expected power value.

In one embodiment, the priority of the first signal is equal to the priority of the second signal, the first node selects between the first parameter set and the second parameter set a parameter set which can obtain a bigger transmit power value as the target parameter set, and determines the first expected power value using the target parameter set.

Embodiment 11

Figure 11:
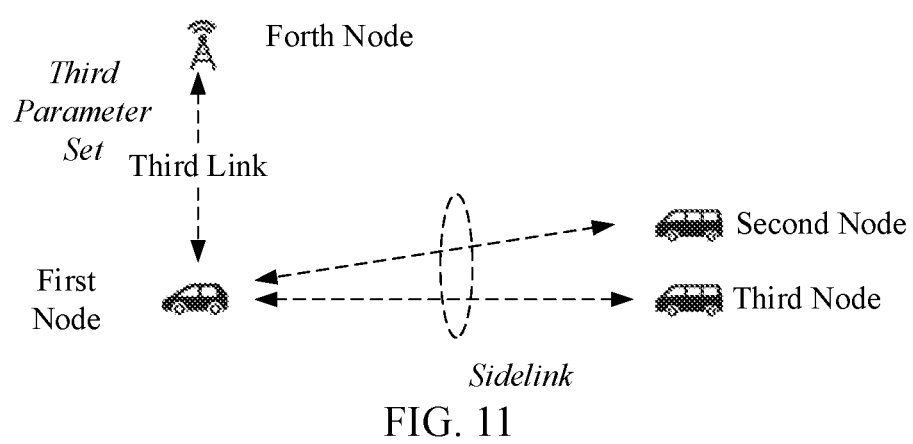
FIG. 11 is a diagram illustrating an application scenario according to another embodiment of the disclosure.

Embodiment 11 illustrates a diagram of another application scenario, as shown in FIG. 11. In FIG. 11, a third link corresponds to a wireless link between the first node and the fourth node in the disclosure, and a side link corresponds to a wireless link between the first node and the second node/third node; the third link corresponds to a third parameter set, and the third link is used for determining a third reference power value; the first power value in the disclosure is equal to a smaller one of the third reference power value and the first expected power value.

Embodiment 12

Figure 12:
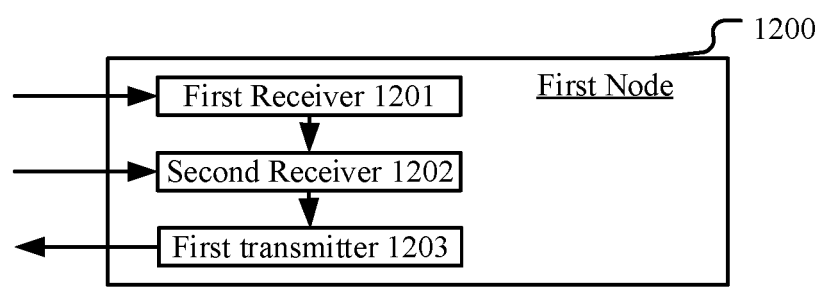
FIG. 12 is a structure block diagram illustrating a first node according to one embodiment of the disclosure.

Embodiment 12 illustrates a structure block diagram of a first node, as shown in FIG. 12. In FIG. 12, the first node 1200 includes a first receiver 1201, a second receiver 1202 and a first transmitter 1203.

The first receiver 1201 receives a first signal.

The second receiver 1202 receives a second signal.

The first transmitter 1203 transmits a first information block and a second information block in a first time window.

In Embodiment 12, the first information block is used for determining whether the first signal is correctly received, and the second information block is used for determining whether the second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel.

In one embodiment, the first receiver 1201 receives a first signaling, and the second receiver 1202 receives a second signaling; the first signaling is used for determining at least one of time domain resources or frequency domain resources occupied by the first signal, and the second signaling is used for determining at least one of time domain resources or frequency domain resources occupied by the second signal; the first signaling includes the first field, and the second signaling includes the second field; the first signaling and the second signaling are both physical layer signalings.

In one embodiment, the first information block and the second information block are both transmitted in a candidate target channel, and a transmit power value of the candidate target channel is a first power value; or, the first information block and the second information block are transmitted in a first target channel and a second target channel respectively, and transmit power values of both the first target channel and the second target channel are the first power value.

In one embodiment, the phrase that the priority of the first signal and the priority of the second signal are used together for determining a first expected power value means that: when the priority of the first signal is higher than the priority of the second signal, a parameter set of a wireless link corresponding to the first signal is used for determining the first expected power value, and the parameter set of the wireless link corresponding to the first signal includes a pathloss of the wireless link corresponding to the first signal; when the priority of the first signal is lower than the priority of the second signal, a parameter set of a wireless link corresponding to the second signal is used for determining the first expected power value, and the parameter set of the wireless link corresponding to the second signal includes a pathloss of the wireless link corresponding to the second signal.

In one embodiment, the first receiver 1201 receives a first reference signal, the second receiver 1202 receives a second reference signal, the first reference signal is used for determining the pathloss of the wireless link corresponding to the first signal, and the second reference signal is used for determining the pathloss of the wireless link corresponding to the second signal.

In one embodiment, the first receiver 1201 receives a third reference signal; the third reference signal is used for determining a third reference power value, and the first power value is a smaller one of the first expected power value and the third reference power value; a transmitter of the third reference signal is non-colocated with a transmitter of the first signal, and the transmitter of the third reference signal is non-colocated with a transmitter of the second signal.

In one embodiment, the first receiver 1201 includes at least the former four of the antenna 452, the receiver 454, the multiantenna receiving processor 458, the receiving processor 456 or the controller/processor 459 illustrated in Embodiment 4.

In one embodiment, the second receiver 1202 includes at least the former four of the antenna 452, the receiver 454, the multiantenna receiving processor 458, the receiving processor 456 or the controller/processor 459 illustrated in Embodiment 4.

In one embodiment, the first transmitter 1203 includes at least the former four of the antenna 452, the transmitter 454, the multiantenna transmitting processor 457, the transmitting processor 468 or the controller/processor 459 illustrated in Embodiment 4.

Embodiment 13

Figure 13:
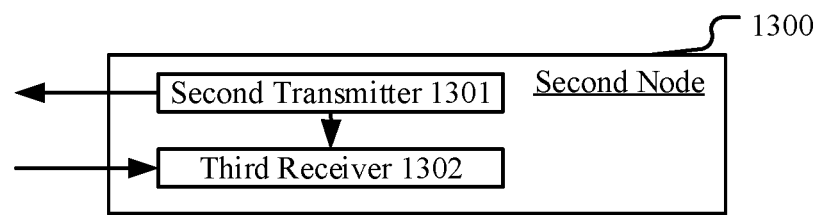
FIG. 13 is a structure block diagram illustrating a second node according to one embodiment of the disclosure.

Embodiment 13 illustrates a structure block diagram of a second node, as shown in FIG. 13. In FIG. 13, the second node 1300 includes a second transmitter 1301 and a third receiver 1302.

The second transmitter 1301 transmits a first signal.

The third receiver 1302 receives a first information block in a first time window.

In Embodiment 13, the first information and a second information are both transmitted in the first time window, the first information block is used for determining whether the first signal is correctly received, and the second information block is used for determining whether a second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel.

In one embodiment, the second transmitter 1301 transmits a first signaling, the first signaling is used for determining at least one of time domain resources or frequency domain resources occupied by the first signal, and the first signaling includes the first field; and the first signaling is a physical layer signaling.

In one embodiment, the first information block and the second information block are both transmitted in a candidate target channel, and a transmit power value of the candidate target channel is a first power value; or, the first information block and the second information block are transmitted in a first target channel and a second target channel respectively, and transmit power values of both the first target channel and the second target channel are the first power value.

In one embodiment, the phrase that the priority of the first signal and the priority of the second signal are used together for determining a first expected power value means that: when the priority of the first signal is higher than the priority of the second signal, a pathloss of a wireless link corresponding to the first signal is used for determining the first expected power value; when the priority of the first signal is not higher than the priority of the second signal, a pathloss of a wireless link corresponding to the second signal is used for determining the first expected power value.

In one embodiment, the second transmitter 1301 transmits a first reference signal; the first reference signal is used for determining the pathloss of the wireless link corresponding to the first signal.

In one embodiment, a third reference signal is used for determining a first reference power value, and the first power value is a smaller one of the first expected power value and the first reference power value; a transmitter of the third reference signal is non-colocated with the third node, and the transmitter of the third reference signal is non-colocated with a transmitter of the first signal.

In one embodiment, the second transmitter 1301 includes at least the former four of the antenna 420, the transmitter 418, the multiantenna transmitting processor 471, the transmitting processor 416 or the controller/processor 475 illustrated in Embodiment 4.

In one embodiment, the third receiver 1302 includes at least the former four of the antenna 420, the receiver 418, the multiantenna receiving processor 472, the receiving processor 470 or the controller/processor 475 illustrated in Embodiment 4.

Embodiment 14

Figure 14:
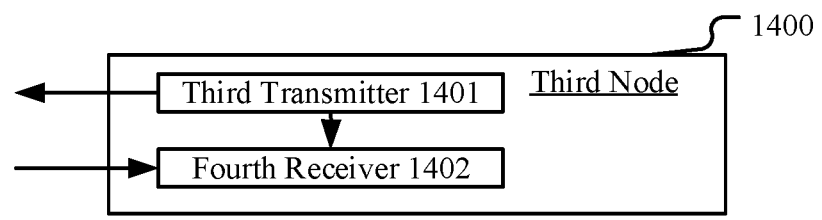
FIG. 14 is a structure block diagram illustrating a third node according to one embodiment of the disclosure.

Embodiment 14 illustrates a structure block diagram of a third node, as shown in FIG. 14. In FIG. 14, the third node 1400 includes a third transmitter 1401 and a fourth receiver 1402.

The third transmitter 1401 transmits a second signal.

The fourth receiver 1402 receives a second information block in a first time window.

In Embodiment 14, a first information and the second information are both transmitted in the first time window, the first information block is used for determining whether a first signal is correctly received, and the second information block is used for determining whether the second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel.

In one embodiment, the third transmitter 1401 transmits a second signaling, the second signaling is used for determining at least one of time domain resources or frequency domain resources occupied by the second signal, and the second signaling includes the second field; and the second signaling is a physical layer signaling.

In one embodiment, the first information block and the second information block are both transmitted in a candidate target channel, and a transmit power value of the candidate target channel is a first power value; or, the first information block and the second information block are transmitted in a first target channel and a second target channel respectively, and transmit power values of both the first target channel and the second target channel are the first power value.

In one embodiment, the phrase that the priority of the first signal and the priority of the second signal are used together for determining a first expected power value means that: when the priority of the first signal is higher than the priority of the second signal, a pathloss of a wireless link corresponding to the first signal is used for determining the first expected power value; when the priority of the first signal is not higher than the priority of the second signal, a pathloss of a wireless link corresponding to the second signal is used for determining the first expected power value.

In one embodiment, the third transmitter 1401 transmits a second reference signal; the second reference signal is used for determining the pathloss of the wireless link corresponding to the second signal.

In one embodiment, a third reference signal is used for determining a first reference power value, and the first power value is a smaller one of the first expected power value and the first reference power value; a transmitter of the third reference signal is non-colocated with the third node, and the transmitter of the third reference signal is non-colocated with a transmitter of the first signal.

In one embodiment, the third transmitter 1401 includes at least the former four of the antenna 420, the transmitter 418, the multiantenna transmitting processor 471, the transmitting processor 416 or the controller/processor 475 illustrated in Embodiment 4.

In one embodiment, the fourth receiver 1402 includes at least the former four of the antenna 420, the receiver 418, the multiantenna receiving processor 472, the receiving processor 470 or the controller/processor 475 illustrated in Embodiment 4.

Embodiment 15

Figure 15:
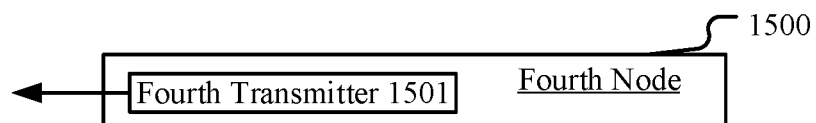
FIG. 15 is a structure block diagram illustrating a fourth node according to one embodiment of the disclosure.

Embodiment 15 illustrates a structure block diagram of a fourth node, as shown in FIG. 15. In FIG. 15, the fourth node 1500 includes a fourth transmitter 1501.

The fourth transmitter 1501 transmits a third reference signal.

In Embodiment 15, the third reference signal is used for determining a third reference power value, and a first power value is a smaller one of a first expected power value and the third reference power value; the first power value is both transmit power values of physical layer channels carrying a first information block and a second information block; the first information block is used for determining whether a first signal is correctly received, and the second information block is used for determining whether a second signal is correctly received; a priority of the first signal and a priority of the second signal are used together for determining the first expected power value, and the first power value is not greater than the first expected power value; a first field and a second field are used for indicating priorities of the first signal and the second signal respectively; the first field and the second field are both transmitted in a physical layer channel.

In one embodiment, the fourth transmitter 1501 includes at least the former four of the antenna 420, the transmitter 418, the multiantenna transmitting processor 471, the transmitting processor 416 or the controller/processor 475 illustrated in Embodiment 4.

Embodiment 16

Figure 16:
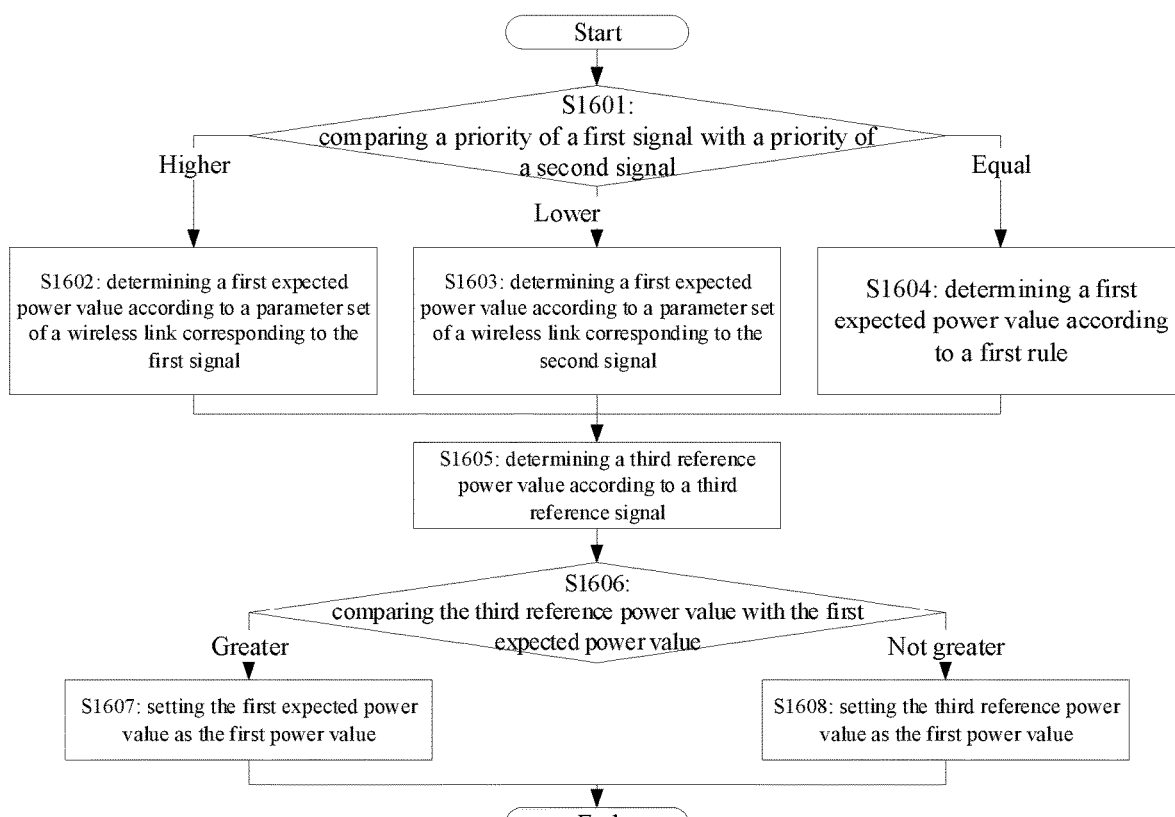
FIG. 16 is a flowchart of determining a first power value according to one embodiment of the disclosure.

Embodiment 16 illustrates a flowchart of determining a first power value according to the disclosure, as shown in FIG. 16. The first node performs the following operations to determine the first power value.

In S1601: comparing a priority of a first signal with a priority of a second signal; when the priority of the first signal is greater than the priority of the second signal, going to S1602; when the priority of the first signal is lower than the priority of the second signal, going to S1603; when the priority of the first signal is equal to the priority of the second signal, going to S1604.

In S1602: determining a first expected power value according to a parameter set of a wireless link corresponding to the first signal.

In S1603: determining a first expected power value according to a parameter set of a wireless link corresponding to the second signal.

In S1604: determining a first expected power value according to a first rule.

In S1605: determining a third reference power value according to a third reference signal.

In S1606: comparing the third reference power value with the first expected power value; when the third reference power value is greater than the first expected power value, going to S1607; when the third reference power value is not greater than the first expected power value, going to S1608;

In S1607: setting the first expected power value as the first power value.

In S1608: setting the third reference power value as the first power value.

In one embodiment, the first rule includes: the first node determines autonomously that a parameter set of a wireless link corresponding to the first signal or a parameter set of a wireless link corresponding to the second signal is used for determining the first expected power value.

In one embodiment, the first rule includes: a parameter set of a wireless link corresponding to the first signal is used for determining a first reference power value, a parameter set of a wireless link corresponding to the second signal is used for determining a second reference power value, and a bigger one of the first reference power value and the second reference power value is set as the first expected power value.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The first node and the second node in the disclosure include but not limited to mobile phones, tablet computers, notebooks, network cards, low-power equipment, eMTC terminals, NB-IOT terminals, vehicle-mounted communication equipment, transportation tools, vehicles, RSUs, aircrafts, airplanes, unmanned aerial vehicles, telecontrolled aircrafts, and other radio communication equipment. The base station in the disclosure includes but not limited to macro-cellular base stations, micro-cellular base stations, home base stations, relay base stations, eNBs, gNBs, TRPs, GNSSs, relay satellites, satellite base stations, air base stations, RSUs and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A first node for wireless communication, comprising:
a first receiver, to receive a first signal;
a second receiver, to receive a second signal; and
a first transmitter, to transmit a first information block and a second information block in a first time window;
wherein the first information block is used for determining whether the first signal is correctly received, and the second information block is used for determining whether the second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel; a physical layer channel occupied by the first signal includes a PSSCH, a physical layer channel occupied by the second signal includes a PSSCH; a physical layer channel carrying the first information block includes a PSFCH, a physical layer channel carrying the second information block includes a PSFCH.

2. The first node according to claim 1, wherein the first receiver receives a first signaling, and the second receiver receives a second signaling; the first signaling is used for determining at least one of time domain resources or frequency domain resources occupied by the first signal, and the second signaling is used for determining at least one of time domain resources or frequency domain resources occupied by the second signal; the first signaling includes the first field, and the second signaling includes the second field; the first signaling and the second signaling are both physical layer signalings.

3. The first node according to claim 1, wherein the first information block and the second information block are transmitted in a first target channel and a second target channel respectively; and transmit power values of both the first target channel and the second target channel are the first power value.

4. The first node according to claim 1, wherein the phrase that the priority of the first signal and the priority of the second signal are used together for determining a first expected power value means that: when the priority of the first signal is higher than the priority of the second signal, a parameter set of a wireless link corresponding to the first signal is used for determining the first expected power value, and the parameter set of the wireless link corresponding to the first signal includes a pathloss of the wireless link corresponding to the first signal; when the priority of the first signal is lower than the priority of the second signal, a parameter set of a wireless link corresponding to the second signal is used for determining the first expected power value, and the parameter set of the wireless link corresponding to the second signal includes a pathloss of the wireless link corresponding to the second signal.

5. The first node according to claim 4, wherein the first receiver receives a first reference signal, the second receiver receives a second reference signal, the first reference signal is used for determining the pathloss of the wireless link corresponding to the first signal, and the second reference signal is used for determining the pathloss of the wireless link corresponding to the second signal.

6. The first node according to claim 1, wherein the first receiver receives a third reference signal; the third reference signal is used for determining a third reference power value, and the first power value is a smaller one of the first expected power value and the third reference power value; a transmitter of the third reference signal is non-colocated with a transmitter of the first signal, and the transmitter of the third reference signal is non-colocated with a transmitter of the second signal.

7. A second node for wireless communication, comprising:
a second transmitter, to transmit a first signal; and
a third receiver, to receive a first information block in a first time window;
wherein the first information and a second information are both transmitted in the first time window, the first information block is used for determining whether the first signal is correctly received, and the second information block is used for determining whether a second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel; a physical layer channel occupied by the first signal includes a PSSCH, a physical layer channel occupied by the second signal includes a PSSCH; a physical layer channel carrying the first information block includes a PSFCH, a physical layer channel carrying the second information block includes a PSFCH.

8. The second node according to claim 7, wherein the second transmitter transmits a first signaling, the first signaling is used for determining at least one of time domain resources or frequency domain resources occupied by the first signal, and the first signaling includes the first field; and the first signaling is a physical layer signaling.

9. The second node according to claim 7, wherein the first information block is received in a first target channel by the second node, the second information block is received in a second target channel by a node other than the second node; and transmit power values of both the first target channel and the second target channel are the first power value.

10. The second node according to claim 7, wherein a third reference signal is used for determining a first reference power value, and the first power value is a smaller one of the first expected power value and the first reference power value; a transmitter of the third reference signal is non-colocated with the second node, and the transmitter of the third reference signal is non-colocated with a transmitter of the second signal.

11. A method in a first node for wireless communication, comprising:
receiving a first signal;
receiving a second signal; and
transmitting a first information block and a second information block in a first time window;
wherein the first information block is used for determining whether the first signal is correctly received, and the second information block is used for determining whether the second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel; a physical layer channel occupied by the first signal includes a PSSCH, a physical layer channel occupied by the second signal includes a PSSCH; a physical layer channel carrying the first information block includes a PSFCH, a physical layer channel carrying the second information block includes a PSFCH.

12. The method in the first node according to claim 11, comprising:
receiving a first signaling; and
receiving a second signaling;
wherein the first signaling is used for determining at least one of time domain resources or frequency domain resources occupied by the first signal, and the second signaling is used for determining at least one of time domain resources or frequency domain resources occupied by the second signal; the first signaling includes the first field, and the second signaling includes the second field; the first signaling and the second signaling are both physical layer signalings.

13. The method in the first node according to claim 11, wherein the first information block and the second information block are transmitted in a first target channel and a second target channel respectively; and transmit power values of both the first target channel and the second target channel are the first power value.

14. The method in the first node according to claim 11, wherein the phrase that the priority of the first signal and the priority of the second signal are used together for determining a first expected power value means that: when the priority of the first signal is higher than the priority of the second signal, a parameter set of a wireless link corresponding to the first signal is used for determining the first expected power value, and the parameter set of the wireless link corresponding to the first signal includes a pathloss of the wireless link corresponding to the first signal; when the priority of the first signal is lower than the priority of the second signal, a parameter set of a wireless link corresponding to the second signal is used for determining the first expected power value, and the parameter set of the wireless link corresponding to the second signal includes a pathloss of the wireless link corresponding to the second signal.

15. The method in the first node according to claim 11, comprising:
receiving a first reference signal; and
receiving a second reference signal;
wherein the first reference signal is used for determining the pathloss of the wireless link corresponding to the first signal, and the second reference signal is used for determining the pathloss of the wireless link corresponding to the second signal.

16. The method in the first node according to claim 11, comprising:
receiving a third reference signal;
wherein the third reference signal is used for determining a third reference power value, and the first power value is a smaller one of the first expected power value and the third reference power value; a transmitter of the third reference signal is non-colocated with a transmitter of the first signal, and the transmitter of the third reference signal is non-colocated with a transmitter of the second signal.

17. A method in a second node for wireless communication, comprising:

transmitting a first signal; and
receiving a first information block in a first time window;
wherein the first information and a second information are both transmitted in the first time window, the first information block is used for determining whether the first signal is correctly received, and the second information block is used for determining whether a second signal is correctly received; a first field and a second field are used for indicating priorities of the first signal and the second signal respectively; transmit power values of physical layer channels carrying the first information block and the second information block are both a first power value; the priority of the first signal and the priority of the second signal are used together for determining a first expected power value, and the first power value is not greater than the first expected power value; the first field and the second field are both transmitted in a physical layer channel; a physical layer channel occupied by the first signal includes a PSSCH, a physical layer channel occupied by the second signal includes a PSSCH; a physical layer channel carrying the first information block includes a PSFCH, a physical layer channel carrying the second information block includes a PSFCH.

18. The method in the second node according to claim 17, comprising:
transmitting a first signaling;
wherein the first signaling is used for determining at least one of time domain resources or frequency domain resources occupied by the first signal, and the first signaling includes the first field; and the first signaling is a physical layer signaling.

19. The method in the second node according to claim 17, wherein the first information block is received in a first target channel by the second node, the second information block is received in a second target channel by a node other than the second node, and transmit power values of both the first target channel and the second target channel are the first power value.

20. The method in the second node according to claim 17, wherein a third reference signal is used for determining a first reference power value, and the first power value is a smaller one of the first expected power value and the first reference power value; a transmitter of the third reference signal is non-colocated with the second node, and the transmitter of the third reference signal is non-colocated with a transmitter of the second signal.

* * * * *